(12) United States Patent
Chen et al.

(10) Patent No.: US 8,780,220 B2
(45) Date of Patent: Jul. 15, 2014

(54) SENSING RANGE SELECTABLE IMAGE SENSOR MODULE

(75) Inventors: Yen-Chao Chen, Taichung (TW); Shih-Ming Lee, Taichung (TW); Hsih-Hsien Yang, Taichung (TW)

(73) Assignee: Asia Optical International Ltd., Tortola (BV)

( * ) Notice: Subject to any disclaimer, the term of this patent is extended or adjusted under 35 U.S.C. 154(b) by 180 days.

(21) Appl. No.: 13/327,981

(22) Filed: Dec. 16, 2011

(65) Prior Publication Data

US 2013/0010183 A1 Jan. 10, 2013

(30) Foreign Application Priority Data

Jul. 8, 2011 (TW) .............................. 100124258 A

(51) Int. Cl.
| | | |
|---|---|---|
| *H04N 7/18* | (2006.01) | |
| *H04N 5/33* | (2006.01) | |
| *H04N 5/232* | (2006.01) | |
| *G01J 5/00* | (2006.01) | |
| *G08B 13/191* | (2006.01) | |
| *G08B 13/196* | (2006.01) | |
| *G08B 29/20* | (2006.01) | |

(52) U.S. Cl.
CPC ................ *H04N 5/232* (2013.01); *G08B 29/20* (2013.01); *G08B 13/191* (2013.01); *G08B 13/19695* (2013.01)
USPC .... 348/211.99; 348/143; 348/165; 250/338.3

(58) Field of Classification Search
USPC ................ 348/164, 165, 143, 362; 250/338.3
See application file for complete search history.

(56) References Cited

U.S. PATENT DOCUMENTS

| | | | | |
|---|---|---|---|---|
| 5,355,222 A | * | 10/1994 | Heller et al. ................... | 356/610 |
| 5,936,666 A | * | 8/1999 | Davis ............................ | 348/143 |
| 6,734,911 B1 | | 5/2004 | Lyons | |
| 2005/0040947 A1 | * | 2/2005 | Buckley et al. ............... | 340/567 |
| 2009/0219388 A1 | * | 9/2009 | Zisa et al. ..................... | 348/143 |
| 2011/0057105 A1 | * | 3/2011 | Buckley et al. ............ | 250/338.3 |

FOREIGN PATENT DOCUMENTS

TW  200951884  12/2009

* cited by examiner

*Primary Examiner* — Sinh Tran
*Assistant Examiner* — Shahbaz Nazrul
(74) *Attorney, Agent, or Firm* — Muncy, Geissler, Olds & Lowe, P.C.

(57) ABSTRACT

A sensing range selectable image sensor module includes a lens defining a first light-sensing area, which allows a relatively larger amount of light to pass, and a second light-sensing area, which allows a relatively smaller amount of light to pass, two sensors respectively arranged at one side relative to the lens corresponding to the first light-sensing area and the second light-sensing area and electrically coupled to a controller for receiving light from the first or second light-sensing area and generating a respective trigger signal selectively receivable by the controller.

10 Claims, 6 Drawing Sheets

SENSING RANGE SELECTABLE IMAGE SENSOR MODULE

BACKGROUND OF THE INVENTION

1. Field of the Invention

The present invention relates to image sensor technology and more particularly, to an image sensor module, which allows selection of different sensing ranges.

2. Description of the Related Art

Taiwan Patent No. 200951884 discloses a security system entitled "Monitoring system and control method thereof", which uses two sets of sensors to divide the surrounding area into four sensing zones. When an object enters the so-called overlapped sensing zone, the control unit drives the image pickup devices to pick up the images.

However, the range of the overlapped sensing zone of the aforesaid prior art monitoring system may be excessively large or small due to installation environment differences. After installation of the monitoring system, the overlapped sensing zone can no longer be adjusted. Thus, the aforesaid prior art design cannot satisfy different requirements from different users for use in different conditions.

SUMMARY OF THE INVENTION

The present invention has been accomplished under the circumstances in view. It is the main object of the present invention to provide an image sensor module, which allows selection of different sensing ranges subject to the actual situation, satisfying different requirements from different users.

It is another object of the present invention to provide an image sensor module, which is adjustable subject to the surrounding temperature, avoiding triggering failure or false triggering.

To achieve these and other objects of the present invention, a sensing range selectable sensor module comprises a lens, two sensors, and a controller. The lens comprises a first light-sensing area and a second light-sensing area. The amount of light passable through the first light-sensing area is larger than the amount of light passable through the second light-sensing area. The two sensors are arranged at one same side relative to the lens, and adapted for receiving light through the first light-sensing area and the second light-sensing area respectively to generate a respective trigger signal. The controller is electrically coupled with the two sensors, and selectively controlled to receive the trigger signal generated by one of the two sensors to satisfy different application requirements.

Further, a temperature sensor may be used and electrically coupled to the controller, enabling the controller to adjust the upper threshold voltage and lower threshold voltage of the sensing circuit subject to the surrounding temperature sensed by the temperature sensor.

Further, the controller can be electrically coupled to a camera for providing a shutter signal to the camera to start picking up images upon receipt of a trigger signal from one of the sensors

DETAILED DESCRIPTION OF THE INVENTION

Figure 1:
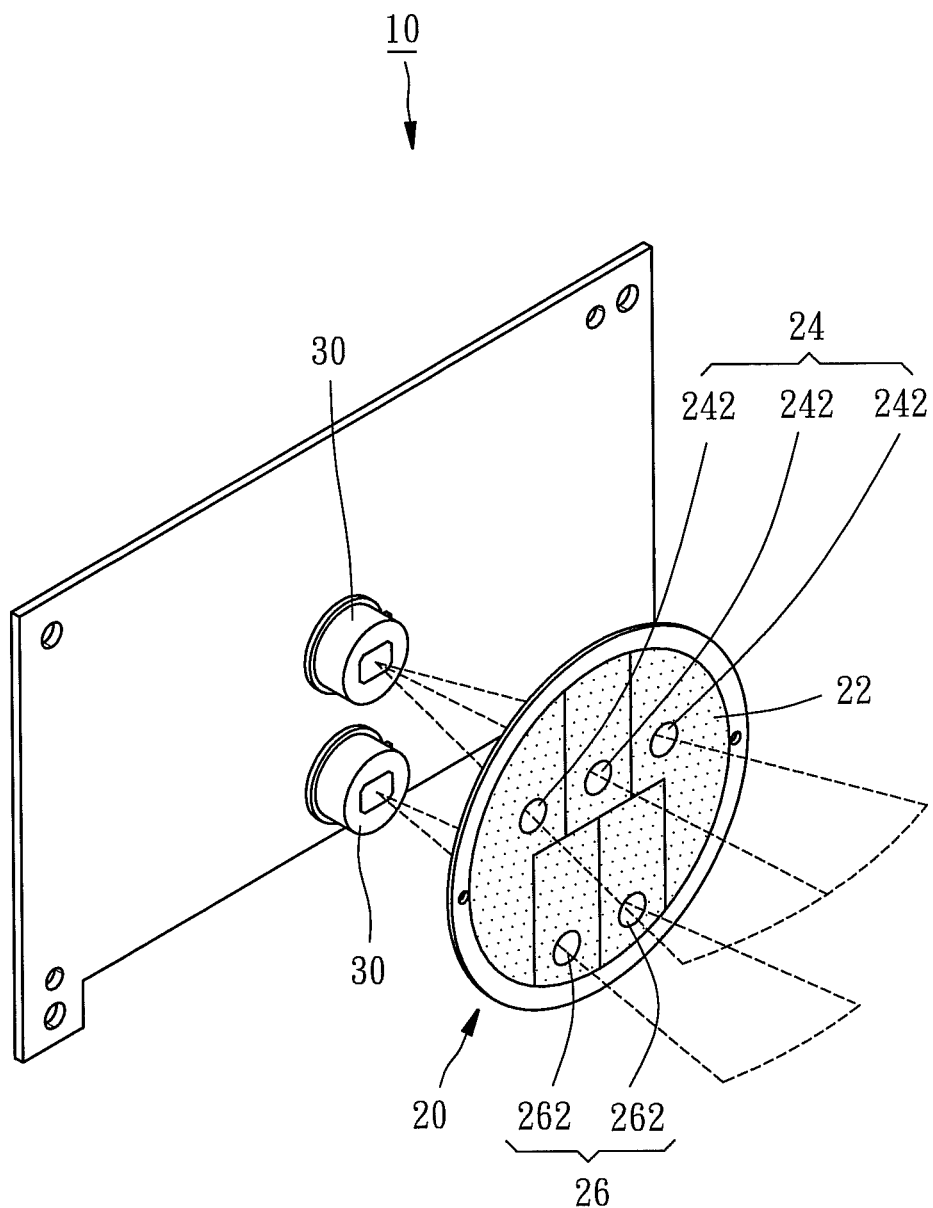
FIG. 1 is a perspective view of a sensing range selectable sensor module in accordance with the first embodiment of the present invention.

Referring to FIG. 1, a sensing range selectable sensor module 10 in accordance with a first embodiment of the present invention is shown comprising a lens 20, two sensors 30 and a controller 40.

Figure 2:
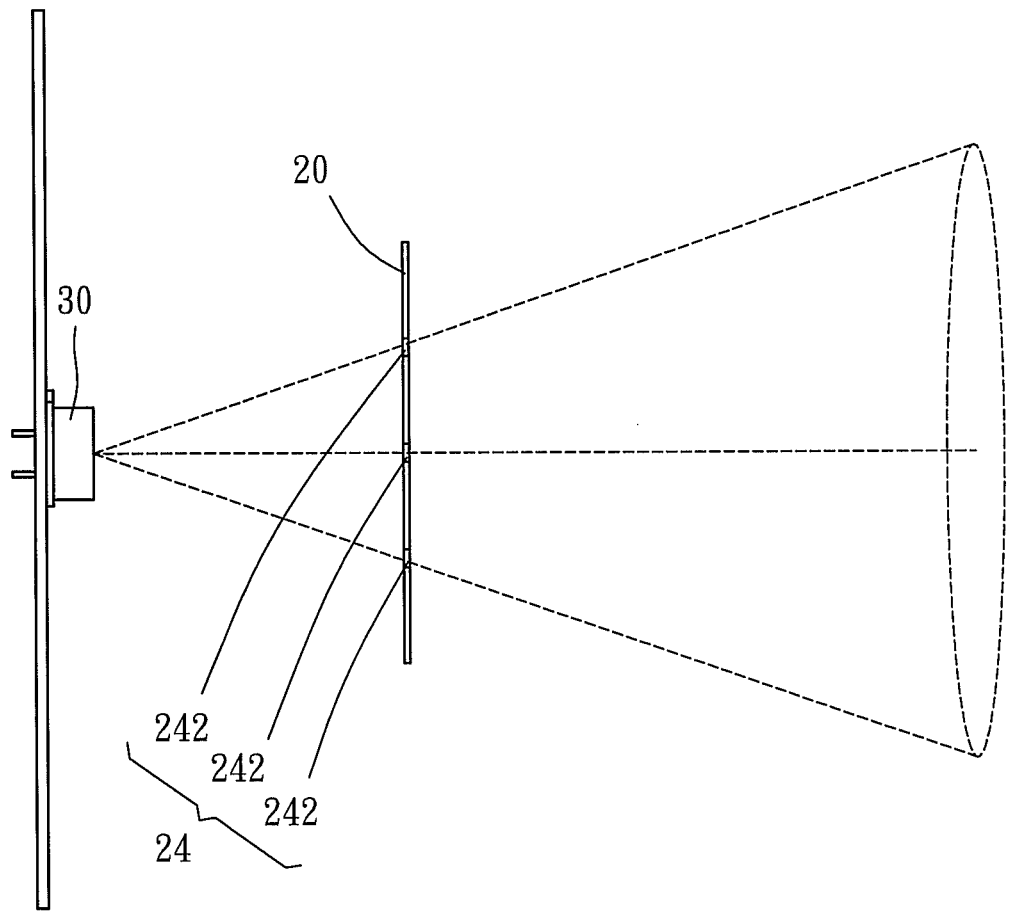
FIG. 2 is a partial top view of the first embodiment of the present invention, illustrating the sensing range of one sensor.
Figure 3:
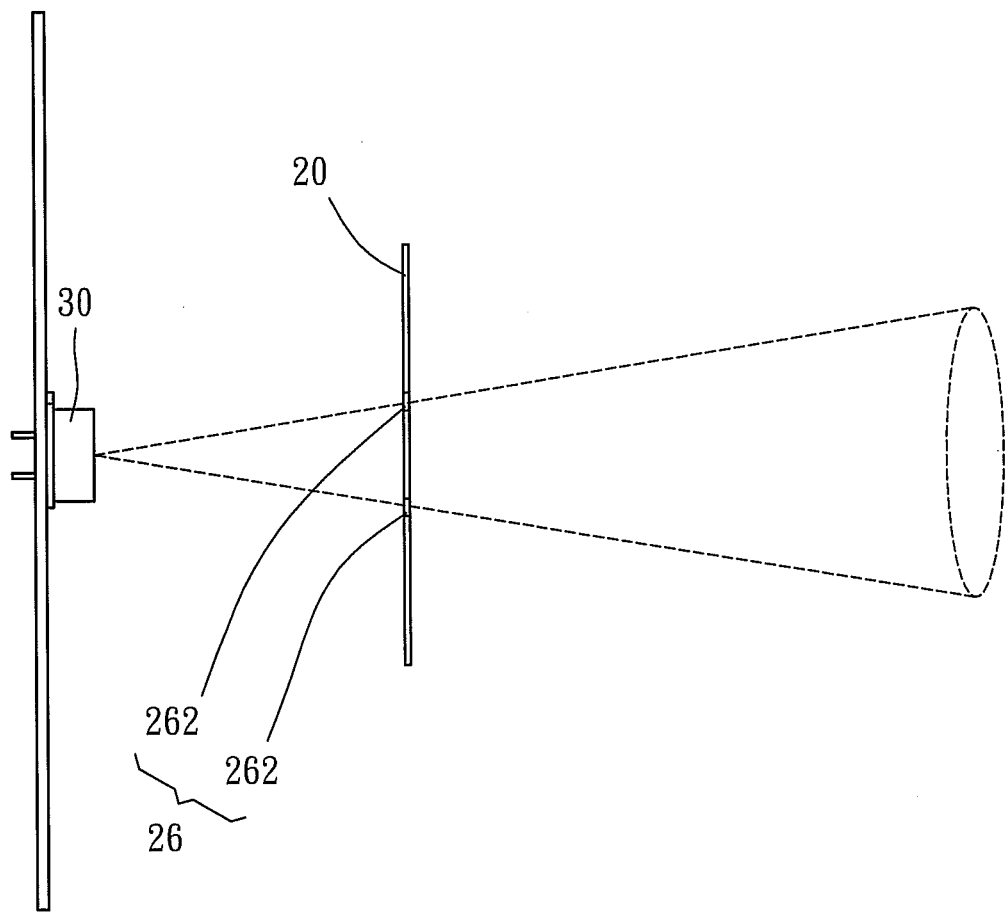
FIG. 3 is similar to FIG. 2, illustrating the sensing range of the other sensor.

The lens 20 is made of a transparent material, comprising a first light-sensing area 24 and a second light-sensing area 26. The first light-sensing area 24 consists of three first transparent blocks 242 that are kept apart from one another. The second light-sensing area 26 consists of two second transparent blocks 262 that are kept apart from each other. The distance between the two second transparent blocks 262 is smaller than the distance between each two adjacent first transparent blocks 242. Thus, the amount of light passable through the first light-sensing area 24 is larger than the amount of light passable through the second light-sensing area 26, as shown in FIGS. 2 and 3.

Figure 4:
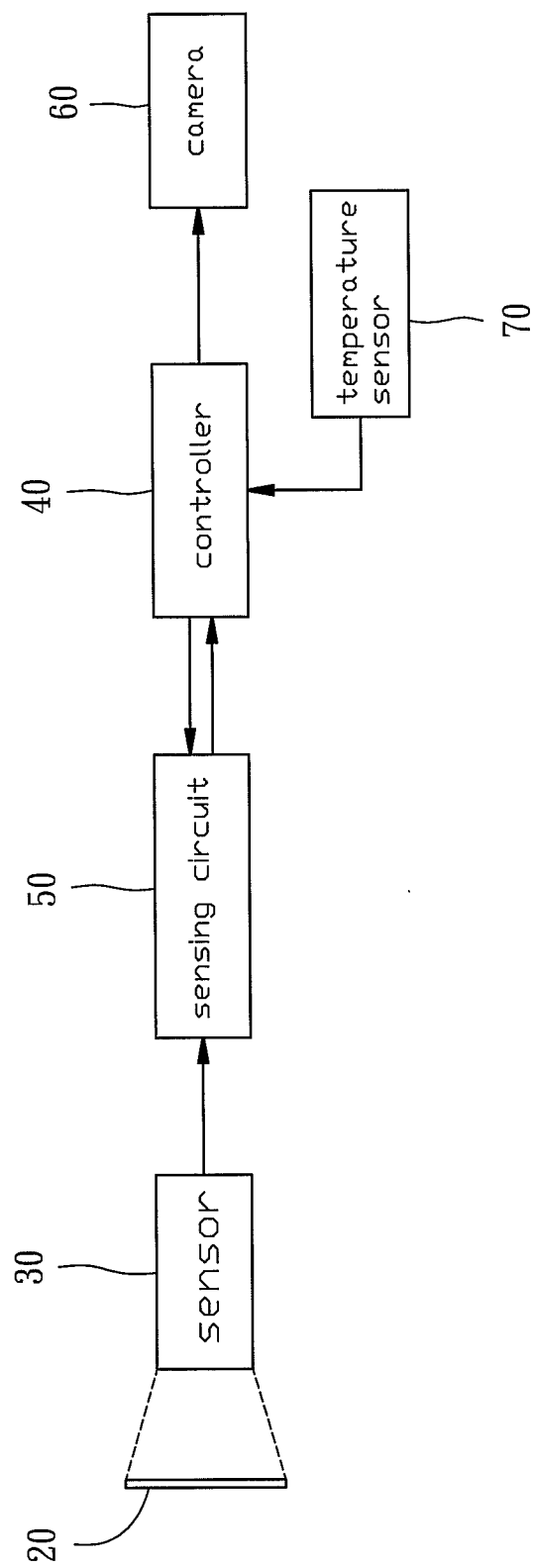
FIG. 4 is a block diagram of the sensing range selectable sensor module in accordance with the first embodiment of the present invention.

The two sensors 30 are, for example, pyroelectric infrared sensors arranged at one same side relative to the lens 20, and respectively disposed corresponding to the first light-sensing area 24 and the second light-sensing area 26. Thus these two sensors 30 can receive different amount of light through the first light-sensing area 24 and the second light-sensing area 26 respectively. The sensing angle of one sensor 30 is about 45° (see FIG. 2). The sensing angle of the other sensor 30 is about 10° (see FIG. 3). When one of the sensor 30 received light from the first light-sensing area 24 or the second light-sensing area 26, the light signal is amplified through a sensing circuit 50, thereby forming a respective trigger signal, as shown in FIG. 4.

The controller 40 is electrically coupled with the two sensors 30 for receiving a trigger signal from one of the sensors 30 via the sensing circuit 50. The controller 40 is also electrically coupled with a camera 60 for providing a shutter signal to the camera 60 to start picking up images upon receipt of a trigger signal from one of the sensors 30.

Figure 5:
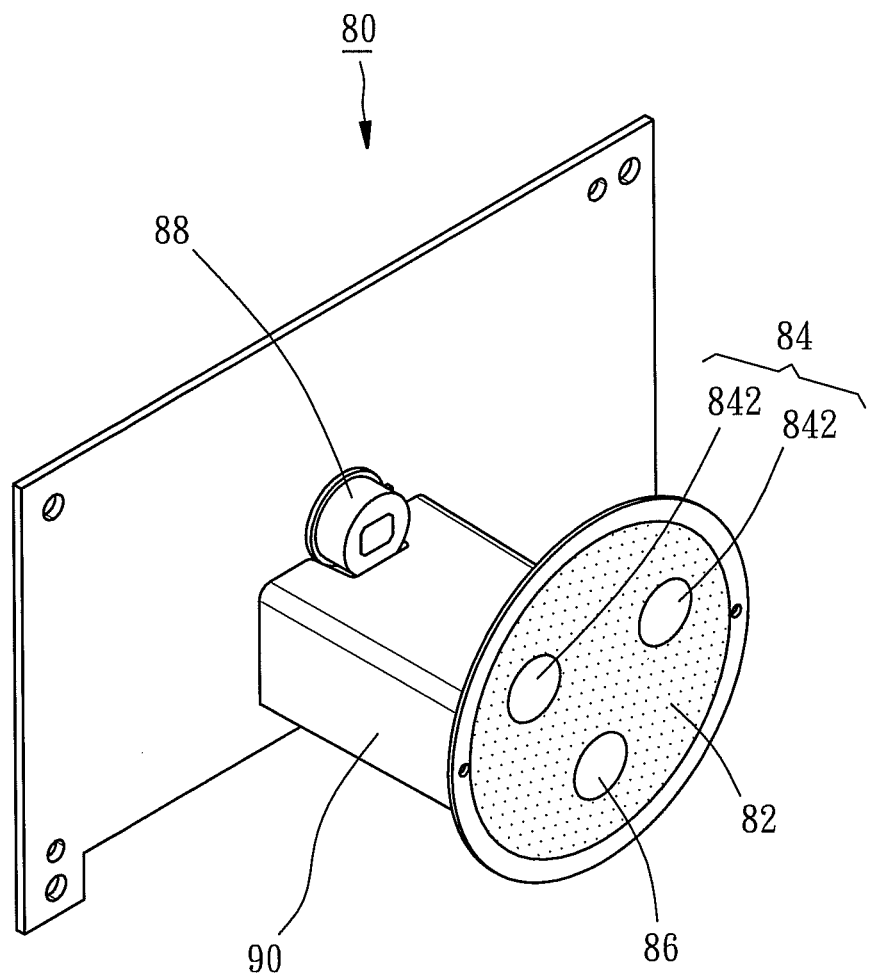
FIG. 5 is a perspective view of a sensing range selectable sensor module in accordance with a second embodiment of the present invention.
Figure 6:
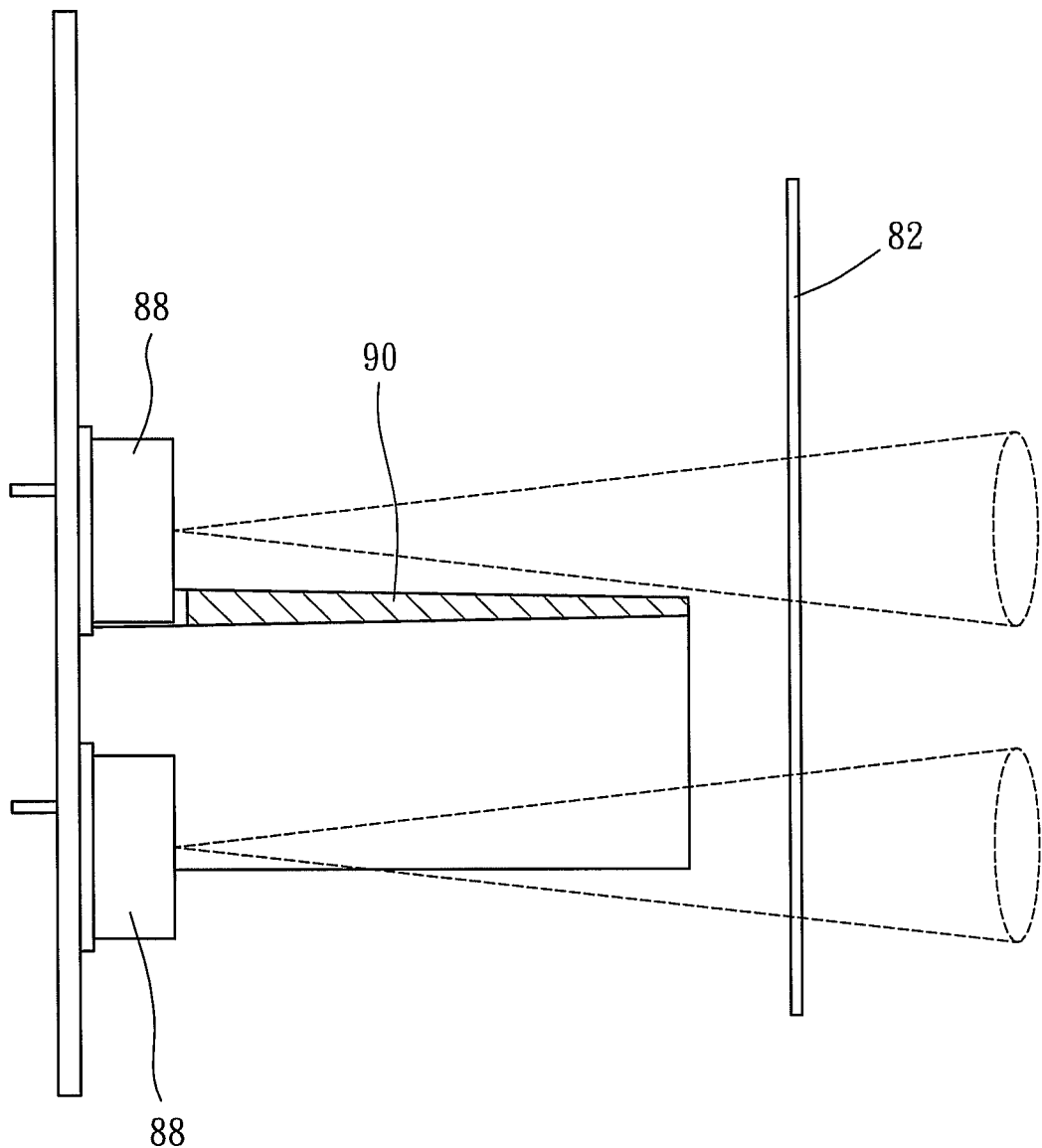
FIG. 6 is a partial sectional side view of the sensing range selectable sensor module in accordance with the second embodiment of the present invention.

Based on the aforesaid structure, the user can selectively use the sensor 30 having a relatively greater sensing range or the sensor 30 having a relatively smaller sensing range to perform sensing operations in sensing different zones, satisfying the user's different application requirements. Further, the sensors 30 may provide different signal responses under different temperature environments. To avoid triggering failure or false triggering due to the effect of the surrounding temperature, as shown in FIG. 4, the controller 40 can be electrically coupled to a temperature sensor 70 for reading the surrounding temperature sensed by the temperature sensor 70 and transmitting a control signal to the sensing circuit 50 subject to the surrounding temperature sensed by the temperature sensor 70, such that the upper threshold voltage and lower threshold voltage of the sensing circuit 50 can be adjusted by the controller 40. FIG. 5 illustrates a sensing range selectable sensor module 80 in accordance with a second embodiment of the present invention. This second embodiment is substantially similar to the aforesaid first embodiment with the exception that the first light-sensing area 84 of the lens 82 is formed of two spaced transparent blocks 842; the second light-sensing area 86 of the lens 82 is formed of one single transparent block; a partition board 90 is set between the two sensors 88; one sensor 88 is surrounded by the partition board 90, as shown in FIG. 6. Thus, the sensing ranges of the two sensors 88 are accurately separated, avoiding cross interference.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. A sensing range selectable image sensor module, comprising:
   a lens comprising a first light-sensing area and a second light-sensing area, the amount of light passable through said first light-sensing area being larger than the amount of light passable through said second light-sensing area;
   two sensors arranged at one same side relative to said lens and adapted for receiving light through said first light-sensing area and said second light-sensing area respectively to generate a respective trigger signal; and
   a controller electrically coupled with said two sensors and selectively controlled to receive the trigger signal generated by one of said two sensors;
   wherein said first light-sensing area is formed of three spaced first transparent blocks and said second light-sensing area is formed of two spaced second transparent blocks; the distance between said two second transparent blocks is shorter than the distance between each two adjacent ones of said first transparent blocks.

2. The sensing range selectable image sensor module as claimed in claim 1, wherein each said sensor, after receiving light through one of said first light-sensing area and said second light-sensing area of said lens, generates a respective said trigger signal through a sensing circuit.

3. The sensing range selectable image sensor module as claimed in claim 2, further comprising a temperature sensor electrically coupled to said controller and adapted for sensing the surrounding temperature.

4. The sensing range selectable image sensor module as claimed in claim 1, further comprising a camera electrically coupled with said controller and adapted for receiving a shutter signal from said controller for starting image pickup.

5. The sensing range selectable image sensor module as claimed in claim 1, further comprising a partition board set between said two sensors to keep said two sensors apart.

6. The sensing range selectable image sensor module as claimed in claim 5, wherein said partition board surrounds one said sensor.

7. The sensing range selectable image sensor module as claimed in claim 3, wherein the temperature sensor senses the surrounding temperature and adjusts the threshold voltages of the sensing circuit.

8. The sensing range selectable image sensor module as claimed in claim 1, wherein the controller is controlled by the user to selectively receive the trigger signal generated by one of the two sensors.

9. A sensing range selectable image sensor module comprising:
   a lens comprising a first light-sensing area and a second light-sensing area, the amount of light passable through said first light-sensing area being larger than the amount of light passable through said second light-sensing area;
   two sensors arranged at one same side relative to said lens and adapted for receiving light through said first light-sensing area and said second light-sensing area, respectively, to generate a respective trigger signal through a sensing circuit; and
   a controller electrically coupled with said two sensors and selectively controlled to receive the trigger signal generated by one of said two sensors, the controller being adapted to adjust upper threshold voltage and lower threshold voltage of the sensing circuit.

10. The sensing range selectable image sensor module as claimed in claim 9, further comprising a temperature sensor electrically coupled to said controller and adapted for sensing the surrounding temperature, wherein the temperature sensor senses the surrounding temperature and adjusts the threshold voltages of the sensing circuit.

\* \* \* \* \*